United States Patent
Elshaer et al.

(10) Patent No.: US 9,825,522 B2
(45) Date of Patent: Nov. 21, 2017

(54) METHOD AND APPARATUS FOR COUPLING CANCELLATION

(71) Applicant: FORD GLOBAL TECHNOLOGIES, LLC, Dearborn, MI (US)

(72) Inventors: Mohamed Elshaer, Canton, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 14/682,448

(22) Filed: Apr. 9, 2015

(65) Prior Publication Data

US 2016/0301300 A1  Oct. 13, 2016

(51) Int. Cl.
*H02M 1/12* (2006.01)
*H02M 1/44* (2007.01)
*H02M 1/14* (2006.01)

(52) U.S. Cl.
CPC .......... *H02M 1/44* (2013.01); *H02M 1/143* (2013.01); *H02M 2001/123* (2013.01)

(58) Field of Classification Search
CPC ..... G05F 1/12; G05F 1/24; G05F 1/16; G05F 1/32; H02M 1/12; H02M 1/14; H02M 1/32; H02M 1/4266; H02M 2001/123
USPC .................. 323/247, 355; 363/39, 45–47, 50
See application file for complete search history.

(56) References Cited

U.S. PATENT DOCUMENTS

| | | | | |
|---|---|---|---|---|
| 4,112,287 A * | 9/1978 | Oates | ...................... | H02M 5/27 219/626 |
| 5,223,767 A * | 6/1993 | Kulka | ................... | H02M 7/538 315/205 |
| 5,336,985 A * | 8/1994 | McKenzie | ................ | G05F 1/56 307/34 |
| 5,789,723 A * | 8/1998 | Hirst | ...................... | G03G 15/80 219/216 |
| 6,476,689 B1 | 11/2002 | Uchida et al. | | |
| 6,518,673 B2 | 2/2003 | Herr et al. | | |
| 6,930,483 B2 * | 8/2005 | Sabate | ................ | G01R 33/3614 324/309 |
| 6,937,115 B2 | 8/2005 | Perreault et al. | | |
| 6,956,755 B2 * | 10/2005 | Nielsen | ................ | H02M 5/458 323/224 |
| 7,180,389 B2 | 2/2007 | Wang et al. | | |
| 7,589,605 B2 | 9/2009 | Perreault et al. | | |
| 7,596,006 B1 * | 9/2009 | Granat | .................. | H02M 1/126 323/224 |
| 8,264,270 B2 | 9/2012 | Chung et al. | | |

(Continued)

FOREIGN PATENT DOCUMENTS

DE  10201100783  10/2012

*Primary Examiner* — Adolf Berhane
(74) *Attorney, Agent, or Firm* — Frank A. MacKenzie; Brooks Kushman P.C.

(57) ABSTRACT

A DC to DC power converter includes a switching circuit and an LC filter configured to reduce parasitic inductance. The LC filter includes an inductor, capacitor, and a coil positioned and oriented relative to and electrically connected with the capacitor. The coil positioned with the capacitor provides the ripple current caused by operation of the switching circuitry to flow through the capacitor and coil with opposite direction. The ripple current flowing through the coil attenuates a magnetic field generated by the capacitor while reducing parasitic inductance of the capacitor.

20 Claims, 6 Drawing Sheets

(56) References Cited

U.S. PATENT DOCUMENTS

| | | | |
|---|---|---|---|
| 2002/0017893 A1* | 2/2002 | Duff, Jr. ................ | H01G 9/155 |
| | | | 320/100 |
| 2008/0205095 A1* | 8/2008 | Pinon ................. | H02M 3/1584 |
| | | | 363/39 |
| 2011/0234196 A1* | 9/2011 | Chiba ................... | H01L 23/50 |
| | | | 323/311 |
| 2017/0019960 A1* | 1/2017 | Qu ..................... | H05B 33/0827 |

\* cited by examiner

METHOD AND APPARATUS FOR COUPLING CANCELLATION

TECHNICAL FIELD

The present disclosure generally relates to electrical noise filtering, and more particularly, to filtering of high-frequency noise from electrical circuits.

BACKGROUND

Vehicle power converters, such as DC to DC power converters, may generate noise during operation. Passive filters, such as LC filters, can be used to reduce this noise but may present cost, weight and packaging issues.

SUMMARY

A DC to DC power converter includes a switching circuit and an LC filter configured to reduce parasitic inductance. The LC filter includes an inductor, capacitor, and a coil positioned and oriented relative to and electrically connected with the capacitor. The coil positioned with the capacitor provides the ripple current caused by operation of the switching circuitry to flow through the capacitor and coil with opposite direction. The ripple current flowing through the coil attenuates a magnetic field generated by the capacitor while reducing parasitic inductance of the capacitor.

An LC filter includes an inductor, a capacitor, and a coil electrically connected in series and stacked on the capacitor. The coil may have a predefined number of turns and diameter based on a size of the capacitor. The coil may be positioned and oriented with the capacitor to direct a ripple current flowing through the capacitor and coil in opposite directions. The ripple current flowing in opposite directions results in a magnetic field offset between the capacitor and coil to reduce a parasitic inductance of the capacitor.

A method for attenuating a magnetic field at a power convertor configured with an LC filter is provided. The method may attenuate a magnetic field generated by a capacitor of the LC filter by configuring an inductor and a coil of the LC filter to direct a ripple current from the capacitor to the coil. The method directs the ripple current to flow through the capacitor and coil in opposite directions to reduce parasitic inductance of the capacitor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure provides a cost effective solution to improve filtering of noise at a bus bar. In a vehicle electric system, a common mode noise and differential mode noise may be created based on one or more power supplies. The vehicle electric system may use input and/or output filters to attenuate the noise from the one or more power supplies. The input and output filters may have degraded performance based on component self-parasitic and/or coupling between filter components and other components in the circuit in close proximity with the filter. A filter design may require additional components to avoid the degraded performance caused by the noise generated from switching circuitry. The additional components and/or an increase in size of components may cause an increase in cost of the filter. For example, at high frequencies the components of the filter may affect inductances based on inductive coupling between a capacitor's parasitic inductance and the bus bar.

The proposed design is to use a low pass filter (LC filter) configuration to improve filter performance in a power conversion system. The filter configuration is designed to decouple the inductive coupling between the bus bar and the capacitor for a low pass LC filter. The circuit configuration introduces negative coupling between the bus bar connecting the inductor to the capacitor and the capacitor's parasitic inductance. The negative coupling may introduce negative inductance at the capacitor branch. The negative coupling may minimize the capacitor's branch parasitic inductance. The use of an additional inductor and a larger capacitor with the LC filter may cancel inductive coupling between the capacitor's parasitic inductance and the bus bar. The filter configuration may maximize the filter's input impedance and minimize the filter's output impedance after its cutoff frequency.

For example, at high frequencies an inductor capacitance lowers the filter input impedance causing the output impedance to be controlled only by the capacitor branch impedance. Thus, at high frequency the capacitor's parasitic inductance acts as an antenna and couples noise from the inductor bus bar. To maximize the filter's input impedance, the proposed filter configuration uses the additional inductance in series with the output capacitor. The additional inductance increases the output impedance. Therefore in order to decouple, the filter configuration provides the larger capacitor to provide a magnetic field of opposite direction and same phase as the magnetic field passing through it.

A vehicle electrical/electronic component and/or subsystem are designed based on one or more Electromagnetic Compatibility (EMC) requirements. The EMC requirements ensure that the component and/or subsystem do not exceed or are within a predefined threshold for noise. A component exceeding a predefined threshold for noise may affect the performance of other components and/or subsystems.

For example, a DC to DC power converter may be regulated based on the EMC requirements shown below:

TABLE 1

| Band # | RF Service | Frequency Range (MHz) | Limits Average (dbuV) | Quasi-Peak (dbuV) |
|---|---|---|---|---|
| EU1 | Long Wave (LW) | 0.15-0.28 | 77 | 89 |
| G1 | Medium Wave (AM) | 0.53-1.7 | 54 | 66 |
| JA1 | FM 1 | 76-90 | — | 36 |
| G3 | FM 2 | 87.5-108 | — | 36 |

As shown in Table 1, the medium wave (AM) radio frequency (RF) operates in a range of 0.53 to 1.7 MHz (megahertz) at a 54 dbuV (decibels relative to one microvolt). Therefore, the converter providing noise within a frequency range of 0.53 MHz and 54 dbuV may cause interference to the AM frequency. The converter may be coupled to the filter to reduce and/or substantially eliminate the noise. The filter is used to remove unwanted frequency components from the signal, to enhance wanted ones, or both.

The filter (e.g., LC low pass filter) may ensure that the electrical/electronic component does not interfere with the RF services of other components and/or subsystems. Before coupling a low-pass filter with the electrical/electronic component, analysis may be performed to determine what size of filter is need to remove unwanted frequency. For example, the low-pass filter with a coupling design (i.e., the coil) may be constructed based on an LC filter model used to determine filter attenuation based on contribution of components as shown in FIG. 1.

Figure 1:
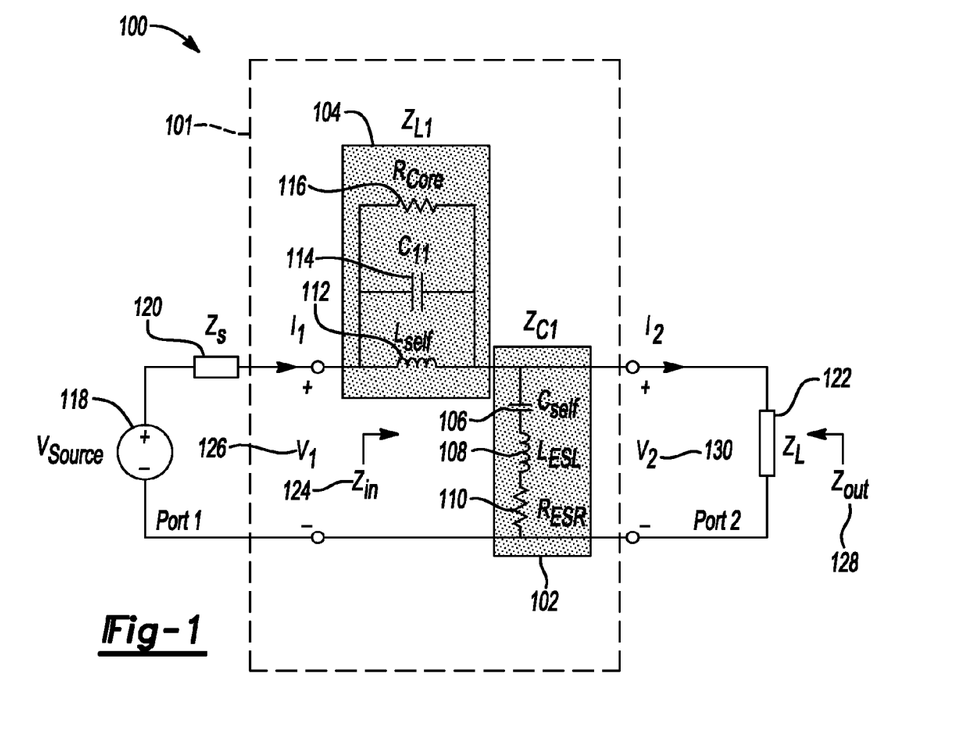
FIG. 1 is an electrical schematic for measuring contributions of self-parasitic to filter attenuation of one or more components of an LC filter.

FIG. 1 is an electrical schematic 100 for measuring contributions of components self-parasitic to filter attenuation of one or more components of the LC filter. The electrical schematic 100 comprises the LC filter 101 having a capacitor equivalent circuit 102 and an inductor equivalent circuit 104. The inductor equivalent circuit 104 and the capacitor equivalent circuit 102 are configured to form the LC filter 101. The LC filter 101, as a low-pass filter, is configured to attenuate signals with frequencies higher than a cutoff frequency. The capacitor equivalent circuit 102 includes a capacitor $C_{self}$ 106, an inductor $L_{ESL}$ 108, and a resistor $R_{ESR}$ 110 in series with each other. The inductor $L_{ESL}$ 108 represents the LC filter's 101 capacitor's 102 parasitic inductance. The inductor equivalent circuit 104 (e.g., an attenuation circuit) includes an inductor $L_{self}$ 112, a capacitor $C_{tt}$ 114, and a resistor $R_{Core}$ 116 configured in parallel with each other. The inductor $L_{self}$ 112 is the inductor equivalent circuit 104 self-inductance. The capacitor $C_{tt}$ 114 is the LC filter inductor's intertwining capacitance. The inductor equivalent circuit 104 and the capacitor equivalent circuit 102 are configured to measure the filter attenuation of the LC filter 101.

The electrical schematic 100 is a circuit 100 that includes a voltage source 118 to simulate the noise being injected to the LC filter 101. The circuit 100 further includes source impedance 120 that models the noise source impedance. The LC filter 101 may be configured to filter frequencies generated by this noise source. The design of the LC filter 101 may increase the size of the inductor 112 and capacitor 106 based on the magnitude of noise being generated and the desired level of attenuation. The LC filter 101 is loaded by a load impedance 122. The load impedance 122 provides output impedance $Z_{out}$ 128 of the circuit 100 across a second voltage $V_2$ 130. The performance of the LC filter 101 may be characterized by calculating the voltage ratio of the second voltage V2 130 to a first voltage V1 126. The performance of the LC filter 101 is illustrated on the graphs in FIG. 2A-2C.

The inductor equivalent circuit 104 may provide degradation data to analyze the performance of the LC filter 101 such that the degradation to filter attenuation is depicted due to its self-parasitics between the inductor $L_{Self}$ 112 and capacitor $C_{tt}$ 114. For example, the performance of the filter 101 may be improved by maximizing input impedance $Z_{in}$ 124 of the inductor $L_{ESL}$ 108 and resistor $C_{self}$ 106 based on a first resonant frequency $f_1$ as shown in equation (1) below. As shown in FIG. 1, the input impedance $Z_{in}$ 124 of the circuit 100 is across the first voltage $V_1$ 126.

The circuit 100 provides the variables to calculate contributions of component self-parasitic that may cause filter attenuation. Based on the circuit 100, the resonant frequency for the LC filter 101 may be calculated based on the following equations:

$$f_1 = \frac{1}{2\pi\sqrt{L_{ESL}C_{Self}}} \quad (1)$$

$$f_2 = \frac{1}{2\pi\sqrt{C_{Self}L_{ESL}}} \quad (2)$$

$$f_3 = \frac{1}{2\pi\sqrt{L_{Self}C_{tt}}} \quad (3)$$

Figure 2A:
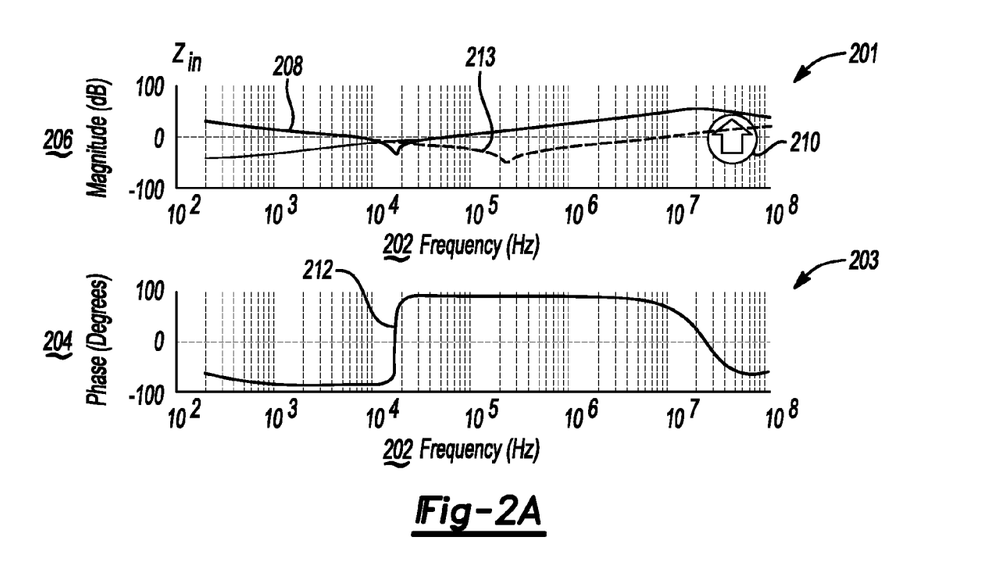
FIGS. 2A-2C are graphs illustrating self-parasitic, input and output impedances, and input-to-output attenuation of the LC filter components in FIG. 1.

FIG. 2A includes two graphs 201, 203 illustrating input impedance $Z_{in}$ 124 of the electrical schematic 100 across the first voltage $V_1$ 126. The graphs 201, 203 have an x-axis representing frequency 202 and a y-axis representing magnitude 206 and phase 204, respectively. A magnitude graph 201 illustrates the input impedance $Z_{in}$ 124 magnitude 208 across a frequency range. As illustrated in the magnitude graph 201, the input impedance $Z_{in}$ 124 performance begins to degrade based on capacitor $C_{tt}$ 114. As shown in the graph 201, the capacitor $C_{tt}$ 114 magnitude 213 models the inductor's 104 intertwining capacitance. This capacitance appears in parallel with the inductor's inductance causing a resonance to occur at a third resonant frequency $f_3$ having a value approximately $10^7$ Hz as calculated in equation (3) above. For frequencies greater than the third resonant frequency $f_3$, the input impedance $Z_{in}$ 124 is dominated by the $C_{tt}$ 114 impedance. Hence, high frequency performance is degraded as illustrated by the input impedance $Z_{in}$ 124 magnitude 208.

The input impedance magnitude 208 begins to decrease 210 at a high frequency. The phase graph 203 illustrates an input impedance phase 212 across a frequency range. As shown in the graph 203, at the third frequency $f_3$ (approximately $10^7$ Hz) the phase is changed from positive ninety degrees to negative ninety degrees indicating that the input impedance is capacitive and dominated by the $C_{tt}$ 114 impedance.

Figure 2B:
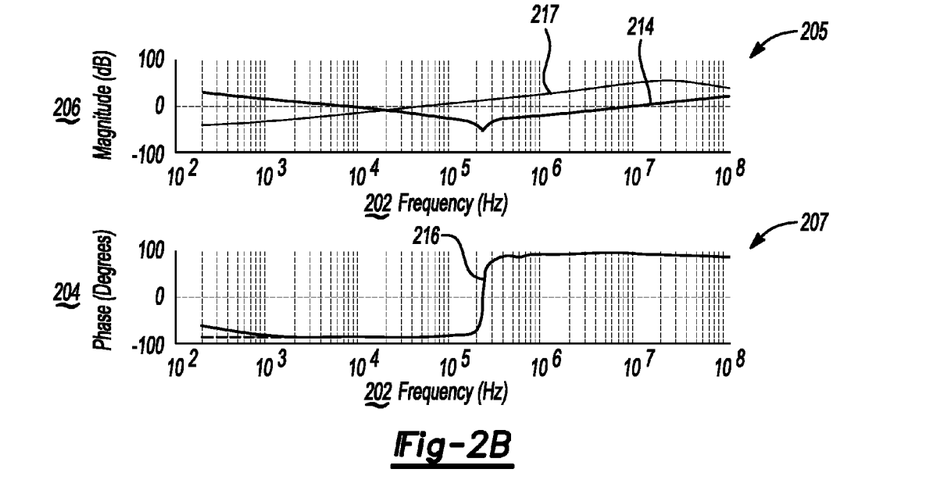

FIG. 2B includes two graphs 205, 207 illustrating output impedance $Z_{out}$ 128 of the electrical schematic 100 across the second voltage $V_2$ 130. The graphs 205, 207 have an x-axis representing frequency 202 and a y-axis representing magnitude 206 and phase 204, respectively. A magnitude graph 205 illustrates an output impedance $Z_{out}$ magnitude 214 across a frequency range. As illustrated in the magnitude graph 205, the output impedance 128 performance begins to degrade based on $C_{tt}$ 114 magnitude 217 that models the inductor's self-impedance. The LC filter attenuation may be improved by minimizing the output impedance based on reducing the inductance in the capacitor branch.

The output impedance $Z_{out}$ magnitude 214 begins to increase at high frequency after the capacitor 106 resonates with the inductor 108 at a second resonant frequency $f_2$ which is a value greater than $10^5$ Hz as calculated by equation (2) above. The phase graph 207 illustrates an output impedance $Z_{out}$ 216 across a frequency range. As shown in the graph 207, the phase shift (from negative ninety degrees to positive ninety degrees) of the LC filter 101 occurs at relatively a low frequency. The phase shift illustrates when the capacitor branch inductance is resonating with the capacitor's 102 self-capacitance. For example, the output impedance $Z_{out}$ 216 illustrates that the capacitor $C_{self}$ 106 in the LC filter 101 is no longer performing after the second resonate frequency $f_2$, therefore resulting in the degradation in the filter attenuation.

The high frequency attenuation of the LC filter 101 may be improved by eliminating the resonance between the capacitor's parasitic inductance and its parasitic capacitance which occurs at the second frequency $f_2$. Hence, the LC filter's output impedance 128 is maximized at high frequency.

Figure 2C:
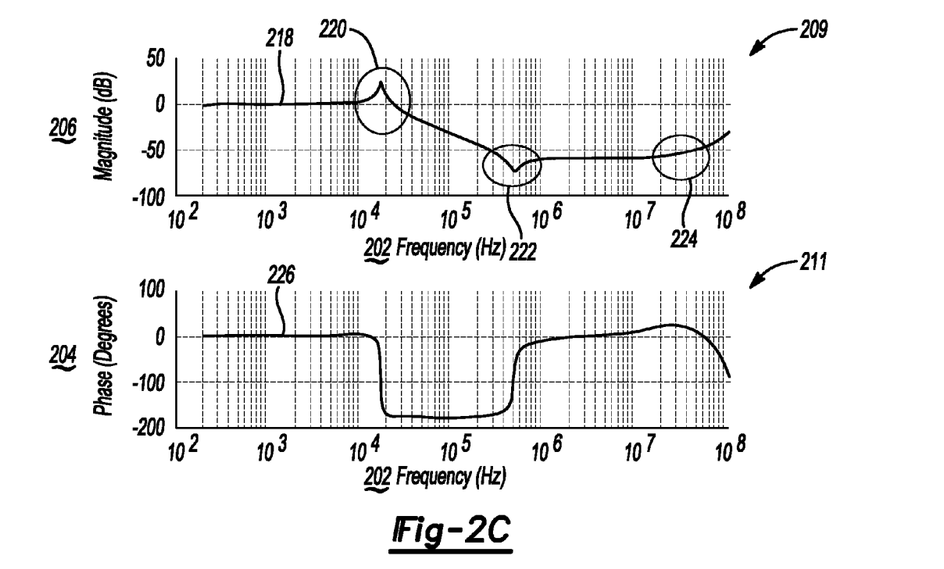

FIG. 2C includes two graphs 209, 211 illustrating a measured filter attenuation of the LC filter 101. The graphs 209, 211 illustrate the performance of the LC filter 101 at different frequencies. The graphs 209, 211 have an x-axis representing frequency 202 and a y-axis representing magnitude 206 and phase 204, respectively. The measured filter attenuation is captured by the configuration of the LC filter as shown in FIG. 1.

A magnitude graph 209 illustrates a filter attenuation magnitude 218 across a frequency range. As illustrated in the magnitude graph 209, the first ($f_1$) 220, second ($f_2$) 222, and third ($f_3$) resonant frequencies 224 provide noise affecting the filter attenuation magnitude 218 as calculated based on equations (1) through (3) above. The filter attenuation magnitude 218 indicates that the attenuation is at higher frequencies. The capacitor branch (inductor $L_{ESL}$ 108 and resistor $C_{self}$ 106) inductance resonates with the capacitor's self-capacitance as illustrated in the second ($f_2$) resonant frequency 222. The result of the second ($f_2$) resonant frequency 222 is degradation in the filter attenuation in the long wave interfering with the AM and FM bands as shown in Table 1. The effective parallel capacitance of the inductor resonates with the inductor's self-inductance at the third ($f_3$) resonant frequency 224. The third ($f_3$) resonant frequency 224 results in degradation in the filter attenuation in the FM band as shown in Table 1.

The phase graph 211 illustrates a filter attenuation phase 226 across a frequency range. As shown in the graph 211, the filter attenuation phase 226 indicates that the capacitor's effective inductance is a critical component for the filter performance.

In response to the filter performance being degraded at high frequencies and the fact the capacitor's effective inductance is a component for the filter performance requires an improved electric circuit topology to mitigate the excessive noise. The filter design may include an additional capacitance and/or inductance to the capacitor branch of the LC filter based on the excessive noise. The addition of a larger capacitor and/or inductor may increase the cost of the LC filter. In lieu of the additional capacitance and inductance, a circuit topology having a coil electrically coupled with the capacitor and located between the inductor and the capacitor may substantially reduce the noise.

Figure 3:
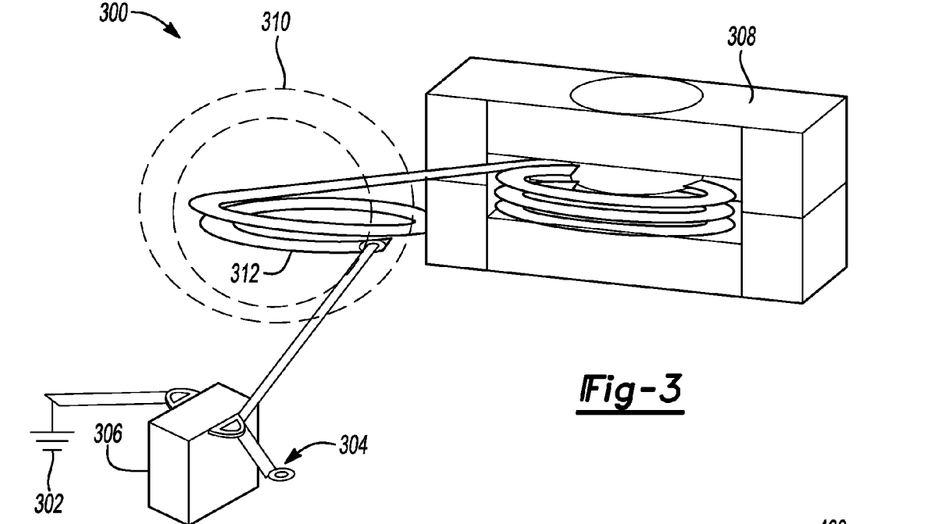
FIG. 3 is an LC filter circuit topology having a coil between an inductor and a capacitor.

FIG. 3 is an LC filter circuit topology 300 having an inductor 308, capacitor 306, and a coil 312 connected with the capacitor 306. The coil 312 may be positioned and oriented relative to the capacitor 306. The capacitor 306 may be modeled as the capacitor equivalent circuit 102 as shown in FIG. 1.

The capacitor 306 has one end connected to a ground 302 with the other end connected between the coil 312 and the output bus bar 304. The coil 312 (e.g., coupling connection) is configured with the capacitor 306 to generate a negative inductive coupling 310 to reduce parasitic inductance of the capacitor 306. The negative inductive coupling 310 is based on ripple current flowing through the coil 310 and the capacitor 306 in an opposite direction. The ripple current in the coil 312 flowing in an opposite direction of the ripple current in the capacitor 306 attenuates a magnetic field generated by the capacitor 306.

For example, a power convertor may have switching circuitry generating ripple current during operation. The LC filter 300 may be configured with the power convertor to eliminate the noise generated from the switching circuitry. The LC filter 300 may have the coil 312 stacked on top of the capacitor 306 and electrically connected between the inductor 308 and capacitor 306. The coil 312 configuration with the capacitor directs the ripple current caused by operation of the switching circuitry to flow through the capacitor 306 and coil 312 with opposite direction to attenuate a magnetic field generated by the capacitor 306. The coil 312 may have a number of turns and/or a diameter based on a size of the capacitor 306. The coil 312 may have the number of turns and/or the diameter based on a desired coupling between the parasitic inductance of the capacitor 306 and an inductance of the coil 312. The LC filter 300 with the coil 312 configuration may be positioned at either an input or an output of the switching circuitry.

Figure 4:
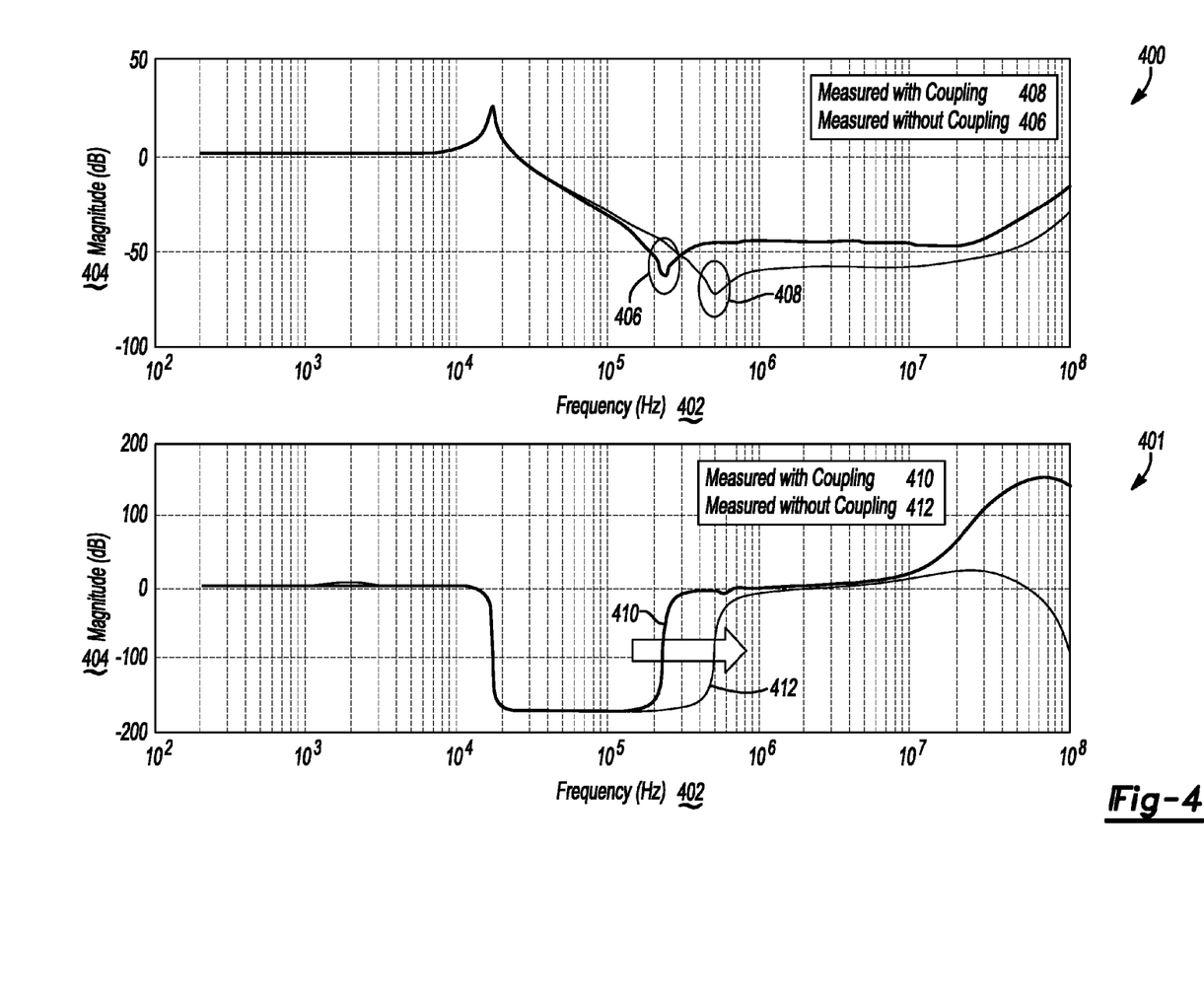
FIG. 4 are graphs depicting the LC filter with and without the coil between the inductor and the capacitor.

FIG. 4 are graphs 400, 401 depicting the LC filter with and without the coil configuration between the inductor and the capacitor. The graph 400 illustrates improvement of the second ($f_2$) resonant frequency with the use of the LC filter having the coil configuration between the inductor and capacitor. The graph 400 has an x-axis representing a frequency 402 in hertz and a y-axis representing a magnitude 404 in decibels. The LC filter without the coil coupling illustrates a filter attenuation magnitude 406 having degradation in the filter attenuation at frequencies that may interface with the AM and FM bands as shown in Table 1. The result of the LC filter having the coil configuration illustrates a filter attenuation magnitude 408 improving the filter attenuation. The transfer function of the LC filter is measured and the results show that the introduced negative inductance further improves the filter attenuation at high frequency.

The graph 401 illustrates a negative inductive coupling measurement between the LC filter having the coil configuration and the LC filter without the coil configuration. The graph 401 has an x-axis representing a frequency 402 and a y-axis representing a magnitude 404. The LC filter without the coil coupling illustrates a negative inductive coupling magnitude 410 starting to degrade at high frequencies because of a magnetic field generated by the capacitance of the LC filter. The LC filter with the coil coupling is illustrated on the graph having a negative inductive coupling magnitude 412 attenuating the magnetic field generated by the capacitor. The graphs 400, 401 illustrate a shift in frequency between the LC filter having the coil coupling and the LC filter without having the coil coupling. The shift in the frequency illustrates that the coil having current flow in an opposite direction of the capacitor of the LC filter attenuates the magnetic field generated by the capacitor.

Figure 5:
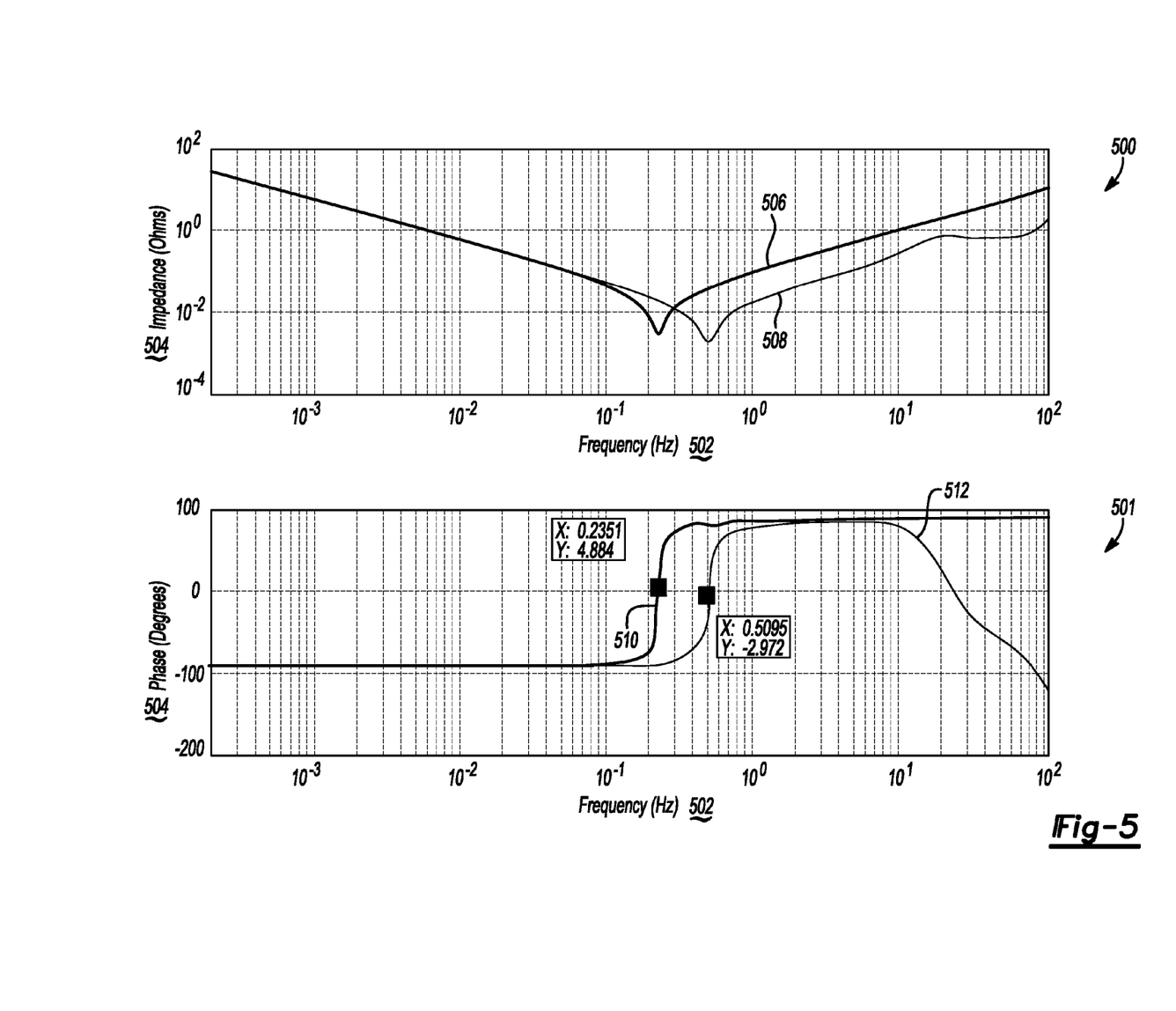
FIG. 5 are graphs depicting a capacitor impedance of the LC filter with and without the coil configuration.

The negative inductive coupling between the coil and the capacitor is designed to reduce the capacitor's effective series inductance. The inductive coupling is calculated from the capacitor impedance curves based on the following equation:

$$M_1 = L_{ESL} - \frac{1}{(2\pi f_{2new})^2 C_{Self}} \quad (4)$$

wherein inductor $L_{ESL}$ represents the LC filter's 101 capacitor's 102 parasitic inductance, capacitor $C_{Self}$ represents the capacitor for the LC filter, and the second resonant frequency $f_2$ represents a resonant frequency for the filter. The LC filter may provide a coil to generate an inductive coupling based on the second resonant frequency $f_2$ as shown in FIG. 5.

FIG. 5 are graphs 500, 501 that depict a capacitor impedance of the LC filter with and without the coil configuration. The graphs 500, 501 have an x-axis representing a frequency 502 and a y-axis representing a magnitude 504. The second resonant frequency $f_2$ having a value equal to approximately 509.5 kilohertz (kHz) may require the inductive coupling to equal approximately −11.632 nano-henry (nH) based on equation 4 above.

The graph 500 illustrates the improvement to the LC filter using the coil to generate a negative inductive coupling between the inductor and the capacitor's parasitic inductance. The magnitude 506 for the LC filter without the coil coupling illustrates the capacitor's inductance at high frequency. The magnitude 508 of the LC filter with the coil coupling generating a negative inductance illustrates an improved LC filter at high frequencies.

The graph 501 illustrates the impedance phase of the capacitor 306 with the use of the LC filter having the coil coupling and without. The negative inductive coupling magnitude 512 for the LC filter having the coil coupling generates a negative inductance of −11.632 nH. The negative inductive coupling magnitude 512 generating a negative inductance is illustrated by the graph 501 as an improvement compared to a magnitude 510 from the LC filter without the coil coupling.

Figure 6:
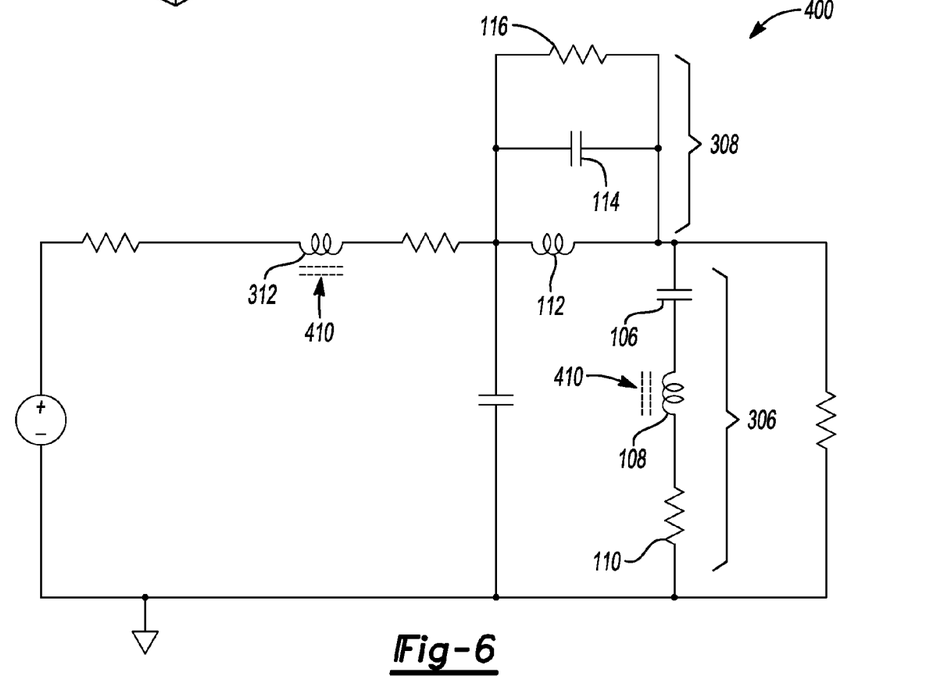
FIG. 6 is a design circuit having the capacitor branch inductance circuit 102 used to calculate the capacitor impedance generated by coupling $M_1$ of the coil.

FIG. 6 is a design circuit having the capacitor branch inductance circuit 102 used to calculate the capacitor impedance generated by coupling $M_1$ of the coil. The design circuit 600 may be used to quantify the negative inductance generated by the coupling of the coil with the capacitor and illustrates the components in the LC filter. The capacitor branch circuit 306 may be represented as the equivalent circuit for the capacitor 102 as shown in FIG. 1. The capacitor equivalent circuit 306 includes the capacitor $C_{self}$ 106, inductor $L_{ESL}$ 108, and resistor $R_{ESL}$ 110 in series.

In this example, the inductance of the coil 312 used to connect the inductor to the capacitor ($L_{coil}$) will be assumed to be 40 nH. The coil coupling is designed such that a mutual inductance of value equal to the capacitor's parasitic inductance is developed between the coil and the capacitor's parasitic inductance. The coupling coefficient k is calculated by the following equation $$k = \frac{L_{ESL}}{\sqrt{L_{coil}L_{ESL}}} \quad (5)$$

wherein coupling coefficient k is the ratio of two inductance values. The coupling coefficient k is a selective value that may be chosen based on the design. To continue from our example above, if the selected coupling coefficient k is 0.1, the inductor $L_{ESL}$ 108 representing the capacitor's parasitic inductance may equal approximately 14.8 nH. In response to our example, the LC filter design may have the following assigned component values as illustrated in FIG. 6. For example, the coil inductor 312 may have a value of approximately 40 nH, the capacitor $C_{self}$ 106 may have a value of approximately 30.8 uF, the capacitor branch inductance $L_{ESL}$ 108 may have a value of approximately 14.8 nH, the resistor $R_{ESL}$ 110 may have a value of approximately 1.68 mΩ, the inductor $L_{Self}$ 112 may have a value of approximately 2.69 uF, the inductor's intertwining capacitance $C_{tt}$ 114 may have a value approximately 22.47 pF, and a resistor $R_{Core}$ 116 may have a value of approximately 480Ω.

The LC filter including a coil configuration with the capacitor may have an output impedance lowering the magnitude at high frequencies. For example, the LC filter with the coil may substantially eliminate the interference with the AM frequency band and the FM frequency band.

Figure 7:
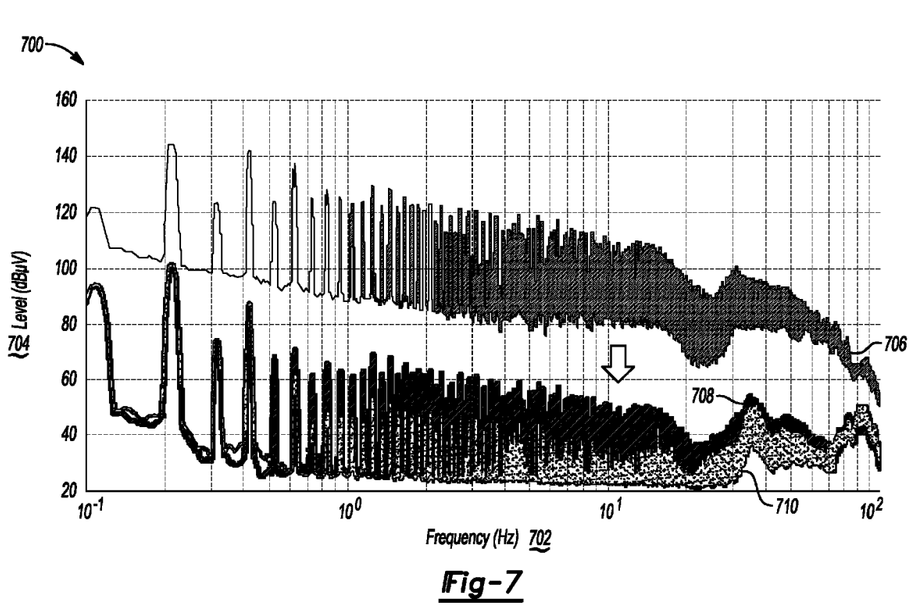
FIG. 7 is a graph illustrating the coil improving the attenuation for a circuit.

FIG. 7 is a graph 700 illustrating the coil improving the attenuation for a circuit. The graph 700 has an x-axis representing a frequency 702 and a y-axis representing a magnitude 704. The input voltage 706 to the circuit is illustrated having an amount of attenuation being generated at the circuit. The circuit having an LC filter with no coil may have a measured output 708 illustrating the noise generated from the voltage output. The circuit having an LC filter with the coil may have a measured output 710 illustrating a reduction in attenuation based on the coil.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A DC to DC power converter comprising:
   an LC filter including an inductor, capacitor, and a coil positioned and oriented relative to and electrically connected with the capacitor such that ripple current caused by operation of switching circuitry flows through the capacitor and coil with opposite direction to attenuate a magnetic field generated by the capacitor to reduce parasitic inductance of the capacitor.

2. The converter of claim 1, wherein the capacitor and coil are stacked on top of each other.

3. The converter of claim 1, wherein the coil is electrically connected with the inductor.

4. The converter of claim 1, wherein a number of turns of the coil is based on a size of the capacitor and a desired coupling between the parasitic inductance of the capacitor and an inductance of the coil.

5. The converter of claim 1, wherein a diameter of the coil is based on a size of the capacitor and a desired coupling between the parasitic inductance of the capacitor and an inductance of the coil.

6. The converter of claim 1, wherein the LC filter is connected to at least one of an input of the switching circuitry and an output of the switching circuitry.

7. The converter of claim 1, wherein the coil is electrically connected before the inductor or after the inductor.

8. An LC filter comprising:
   an inductor;
   a capacitor electrically connected to the inductor; and
   a coil electrically connected in series and stacked on the capacitor so that ripple current flow through the capacitor and coil are in opposite directions resulting in magnetic field offset between the capacitor and coil to reduce a parasitic inductance of the capacitor, the coil having a predefined number of turns and diameter based on a size of the capacitor.

9. The filter of claim 8, wherein the capacitor and coil are stacked on top of each other.

10. The filter of claim 8, wherein the coil is electrically connected with the inductor.

11. The filter of claim 8, wherein the number of turns of the coil is based on the size of the capacitor and a desired coupling between the parasitic inductance of the capacitor and an inductance of the coil.

12. The filter of claim 8, wherein the diameter of the coil is based on the size of the capacitor and a desired coupling between the parasitic inductance of the capacitor and an inductance of the coil.

13. The filter of claim 8, wherein the coil is connected at an input of switching circuitry.

14. The filter of claim 8, wherein the coil is connected at an output of switching circuitry.

15. A method for attenuating a magnetic field at a power convertor, the method comprising:
    attenuating a magnetic field generated by a capacitor of an LC filter including an inductor and a coil by directing a ripple current from the capacitor to the coil such that the ripple current flows through the capacitor and coil in opposite directions to reduce parasitic inductance of the capacitor.

16. The method of claim 15, wherein the capacitor and coil are stacked on top of each other.

17. The method of claim 15, wherein a number of turns of the coil is based on a size of the capacitor and a desired coupling between the parasitic inductance of the capacitor and an inductance of the coil.

18. The method of claim 15, wherein a diameter of the coil is based on a size of the capacitor and a desired coupling between the parasitic inductance of the capacitor and an inductance of the coil.

19. The method of claim 15, further comprising connecting the coil at an input of switching circuitry.

20. The method of claim 15, further comprising connecting the coil at an output of switching circuitry.

* * * * *